(12) United States Patent
Keith et al.

(10) Patent No.: US 11,611,692 B2
(45) Date of Patent: Mar. 21, 2023

(54) FIXED PATTERN NOISE REDUCTION AND HIGH SPATIAL FREQUENCY FILTERING USING VARI-FOCUS LENSES IN LOW CONTRAST SCENES

(71) Applicant: Rockwell Collins, Inc., Cedar Rapids, IA (US)

(72) Inventors: Christopher A. Keith, Wilsonville, OR (US); Ming Yu, Tigard, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 86 days.

(21) Appl. No.: 17/092,876

(22) Filed: Nov. 9, 2020

(65) Prior Publication Data
US 2022/0150397 A1 May 12, 2022

(51) Int. Cl.
  *H04N 5/232* (2006.01)
  *G06T 5/00* (2006.01)
  *G06T 5/50* (2006.01)

(52) U.S. Cl.
  CPC ......... *H04N 5/23212* (2013.01); *G06T 5/002* (2013.01); *G06T 5/003* (2013.01); *G06T 5/50* (2013.01); *H04N 5/23227* (2018.08); *G06T 2207/20024* (2013.01); *G06T 2207/20224* (2013.01)

(58) Field of Classification Search
None
See application file for complete search history.

(56) References Cited

U.S. PATENT DOCUMENTS

| 5,903,659 | A  | * | 5/1999  | Kilgore .............. G06T 5/20 382/218 |
| 6,330,371 | B1 | * | 12/2001 | Chen .............. H04N 5/33 382/218 |
| 6,414,294 | B1 |   | 7/2002  | Marshall et al. |
| 7,865,029 | B2 |   | 1/2011  | Satoh |
| 7,995,859 | B2 |   | 8/2011  | Högasten |
| 8,203,116 | B2 |   | 6/2012  | Young |
| 8,503,821 | B2 |   | 8/2013  | Hogasten |
| 9,723,227 | B2 |   | 8/2017  | Högasten et al. |
| 9,843,742 | B2 |   | 12/2017 | Garrow et al. |

(Continued)

FOREIGN PATENT DOCUMENTS

CN   108200324 B   3/2019
JP      4146948 B2  9/2008
(Continued)

OTHER PUBLICATIONS

Extended Search Report in European Application No. 21205891.1 dated Mar. 17, 2022, 7 pages.

*Primary Examiner* — James M Hannett
(74) *Attorney, Agent, or Firm* — Suiter Swatnz pc llo

(57) ABSTRACT

A method for identifying and correcting fixed pattern noise includes capturing a focused image and an unfocused image via a variable focus lens. Fixed pattern noise represented in the unfocused image is filtered from the focused image. The unfocused image represents a low-pass filtered component of the focused image; subtracting the unfocused image from the focused image results in a high-pass and fixed pattern noise filtered focused image. Image capture and focus of the variable focus lens are synchronized to remove transitional frames from the image stream.

11 Claims, 4 Drawing Sheets

(56) References Cited

U.S. PATENT DOCUMENTS

| | | |
|---|---|---|
| 2005/0285967 A1* | 12/2005 | Suda ................ H04N 5/232122 |
| | | 348/E5.045 |
| 2010/0290130 A1 | 11/2010 | Okamoto |
| 2011/0050496 A1 | 3/2011 | Wu et al. |
| 2012/0275030 A1* | 11/2012 | Kong ....................... G03B 3/10 |
| | | 359/665 |
| 2018/0352154 A1 | 12/2018 | Yu |
| 2018/0352174 A1 | 12/2018 | Kuybeda et al. |
| 2019/0251706 A1 | 8/2019 | Difato et al. |
| 2019/0294024 A1* | 9/2019 | Koehler .................. G02F 1/332 |
| 2020/0145593 A1 | 5/2020 | Gao et al. |

FOREIGN PATENT DOCUMENTS

| | | |
|---|---|---|
| JP | 4603454 B2 | 12/2010 |
| KR | 100531941 B1 | 11/2005 |
| WO | 2011086227 A1 | 7/2011 |
| WO | 2015175907 A1 | 11/2015 |

* cited by examiner

FIXED PATTERN NOISE REDUCTION AND HIGH SPATIAL FREQUENCY FILTERING USING VARI-FOCUS LENSES IN LOW CONTRAST SCENES

BACKGROUND

In many enhanced vision systems, video images are processed with a high-pass filter algorithm. This is especially important for low contrast images; for example, detecting approach lights during landing in daytime fog condition. However, camera noise can also be high frequency and can mask the relevant information detail via a degraded signal-to-noise-ratio. In many camera sensor applications, fixed pattern noise is a dominating noise component; it often requires software correction after factory calibration at several temperatures but is still difficult to filter out during use. In-situ calibration is desirable but cost and size considerations make it problematic. Even with the use of compensation algorithms in some cameras, fixed pattern noise can still dominate in cases such as where frame averaging is used. While the frame averaging will in general, reduce other noise components, fixed pattern noise will still persist, limiting the effectiveness of averaging.

Fixed pattern noise is inherent in digital imaging sensors and manifests as certain pixels reporting higher pixel intensities than intended. When looking for high spatial frequency targets in a low contrast or low spatial frequency scene, the fixed pattern noise shows up as high spatial frequency information, making it more difficult to discern a true target from noise in the digital imaging sensor.

Fixed pattern noise in a digital imaging sensor can change over time, based on sensor settings, and due to environmental conditions such as temperature, reducing the impact of fixed pattern noise characterization during manufacture.

SUMMARY

In one aspect, embodiments of the inventive concepts disclosed herein are directed to a system and method for identifying and correcting fixed pattern noise. A focused image and unfocused image are captured via a variable focus lens, and fixed pattern noise represented in the unfocused image is filtered from the focused image.

In a further aspect, the unfocused image represents a low-pass filtered component of the focused image; subtracting the unfocused image from the focused image results in a high-pass and fixed pattern noise filtered focused image.

In a further aspect, image capture and focus of the variable focus lens are synchronized to remove transitional frames from the image stream.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
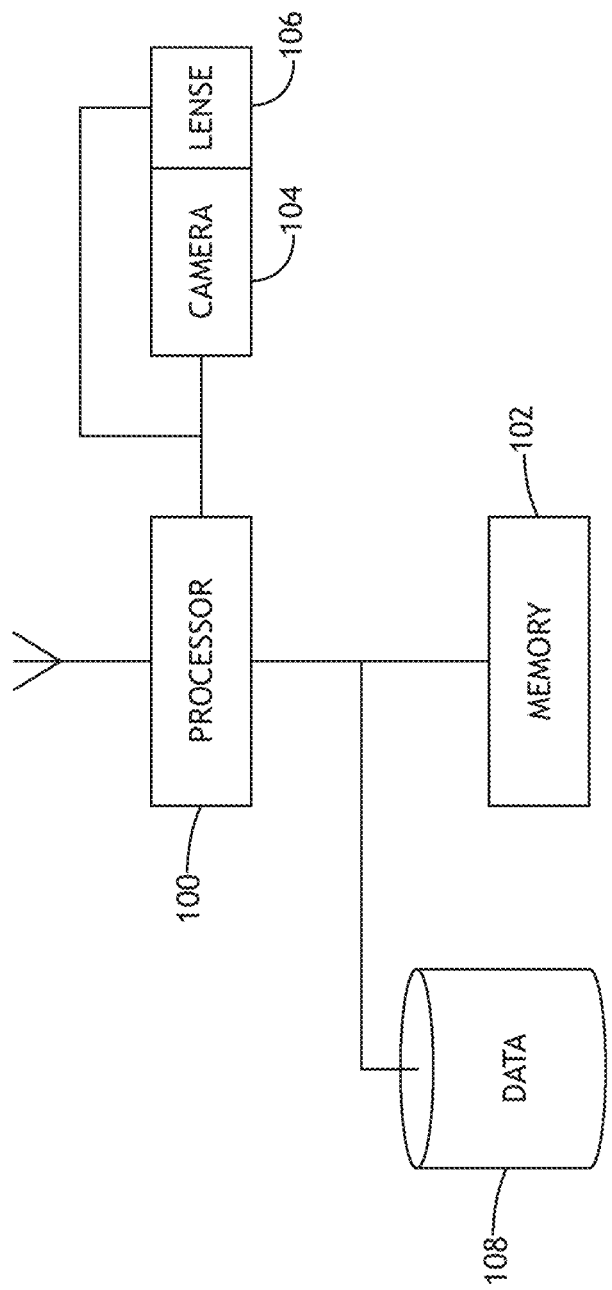
FIG. 1 shows a block diagram of a system for implementing exemplary embodiments of a system for identifying fixed pattern noise.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for identifying and correcting fixed pattern noise. A focused image and unfocused image are captured via a variable focus lens, and fixed pattern noise represented in the unfocused image is filtered from the focused image. The unfocused image represents a low-pass filtered component of the focused image; subtracting the unfocused image from the focused image results in a high-pass and fixed pattern noise filtered focused image. Image capture and focus of the variable focus lens are synchronized to remove transitional frames from the image stream.

Referring to FIG. 1, a block diagram of a system for implementing exemplary embodiments of a system for identifying fixed pattern noise is shown. The system includes a processor 100 connected to a memory 102 for storing processor executable code to configure the processor 100 to receive an image stream from a camera 104 and control the focus of a variable focus lens 106 in the image path of the camera 104.

In at least one embodiment, the processor 100 applies a signal to the variable focus lens 106 to produce a focused image at the camera sensor. The processor 100 then captures one or more focused images. The processor 100 then applies a signal to the variable focus lens 106 to produce a defocused image at the camera sensor. The processor 100 then captures one or more unfocused images.

The unfocused images represent fixed pattern noise in the image sensor. In at least one embodiment, the processor 100 is configured to identify fixed pattern noise in the unfocused images and filter out that fixed pattern noise from the focused images. Fixed pattern noise may change over time and/or based on environmental conditions; therefore, a substantially contemporaneous unfocused image is desirable for filtering. After filtering, a high-pass filter may be applied to help identify low contrast features in the image. In at least one embodiment, the identified fixed pattern noise may be stored in a data storage element 108 for continuous filtering of focused images in an image stream. The stored fixed pattern noise may be periodically updated via a new unfocused image.

Within the context of the present disclosure, an unfocused image may represent a low-pass filtered version of the image along with fixed pattern noise. In at least one embodiment, the processor 100 may perform a logical operation to subtract the unfocused image from the focused image, resulting in a high-pass filtered, fixed pattern noise filtered image. The more defocused the variable focus lens 106, the narrower passband for the low-pass filter.

In at least one embodiment, the processor 100 may synchronize image capture via the camera 104 with a transition of the variable focus lens 106 from a focused state to an unfocused state to prevent transitional frames from being rendered or used to identify fixed pattern noise. In at least one embodiment, transitional frames may be recorded and used in preprocessing to reduce processing time to identify fixed pattern noise; for example, changes in pixel contrast during transition may be used to initially identify real image features.

In at least one embodiment, the processor 100 may periodically apply signals to the variable focus lens 106 to produce a defocused image under certain contrast conditions. The periodic defocused images may be used to identify stuck or dead pixels, store their locations in the data storage element 108, and track them over time.

Figure 2:
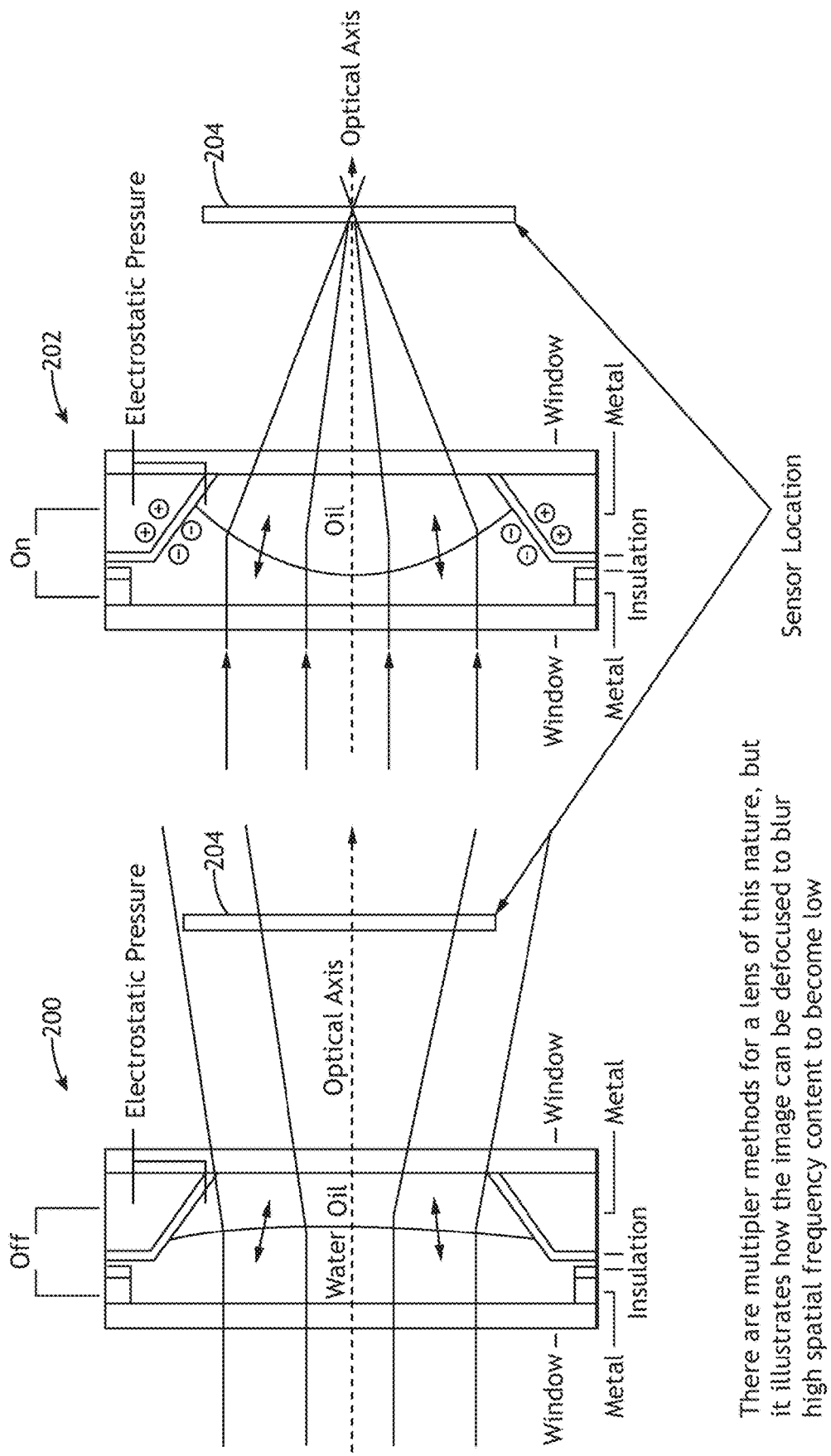
FIG. 2 shows a cross-sectional view of a variable focus lens useful for implementing exemplary embodiments.

Referring to FIG. 2, a cross-sectional view of a variable focus lens useful for implementing exemplary embodiments is shown. Variable focus lenses comprise any optical device in a class of devices to adjust focus in an optical path from an unfocused state 200 to a focused state 202 (and vice versa) via non-mechanical means. For example, electronic signals may be applied to alter electrostatic properties in the lens to force a shape change between fluids wherein the interface between the fluids adjusts the path of light rays. The variable focus lens may be placed anywhere in the light path leading to an image sensor 204 in the camera.

Figure 3:
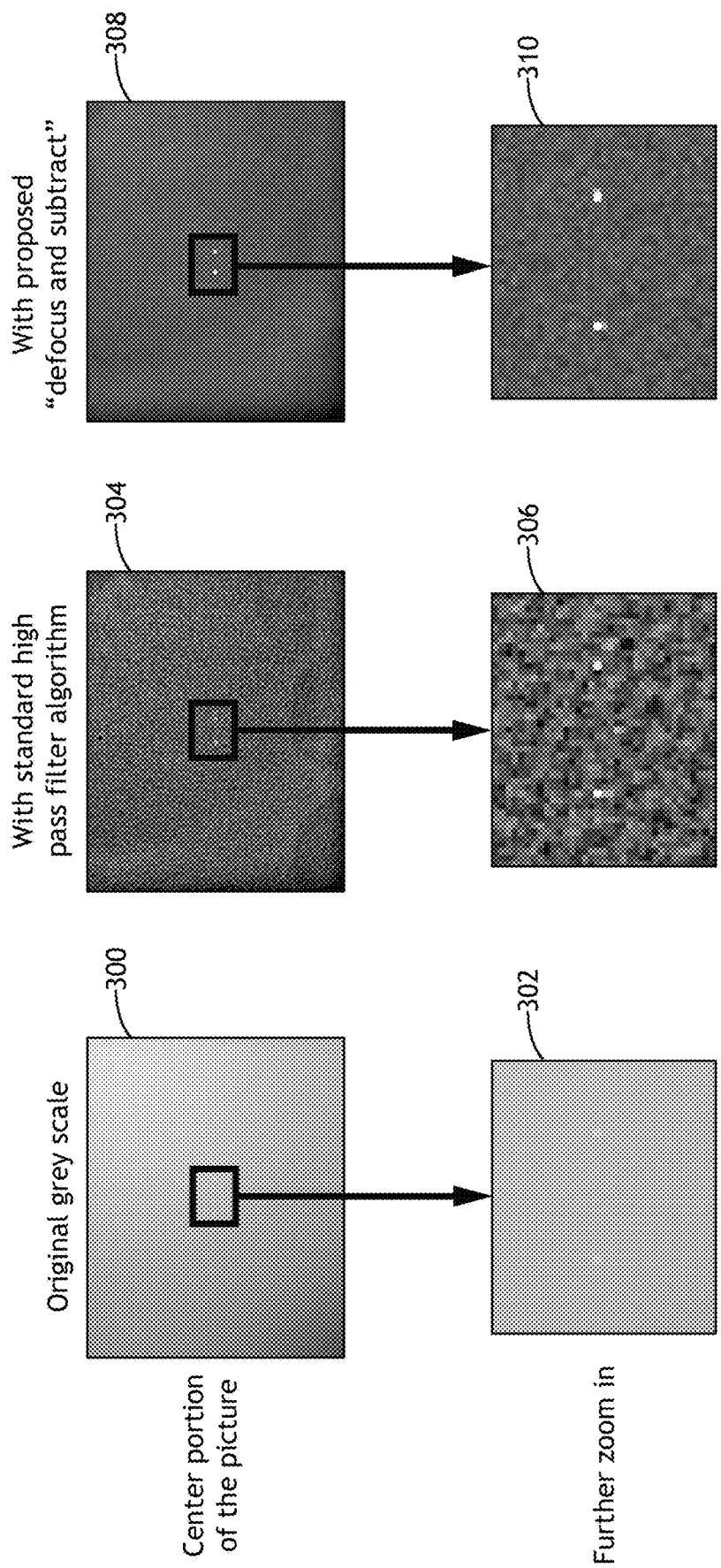
FIG. 3 shows illustrations of images showing fixed pattern noise and after filtering of fixed pattern noise.

Referring to FIG. 3, illustrations of images showing fixed pattern noise and after filtering of fixed pattern noise is shown. In one example, a low contrast image 300 includes features of interest such as signal lights identifiable in a zoomed-in portion 302. A high-pass filter may be applied to produce a high-pass filtered image 304 but the features of interest in a zoomed-in portion 306 of the high-pass filtered image may be obscured or otherwise difficult to identify due to fixed pattern noise.

In at least one embodiment, where an unfocused image is used to identify fixed pattern noise and either filter out the fixed pattern noise or subtract the unfocused image from the focused image, a high-pass and fixed pattern noise filtered image 308 and zoomed-in portion 310 may have more easily identifiable features of interest.

Figure 4:
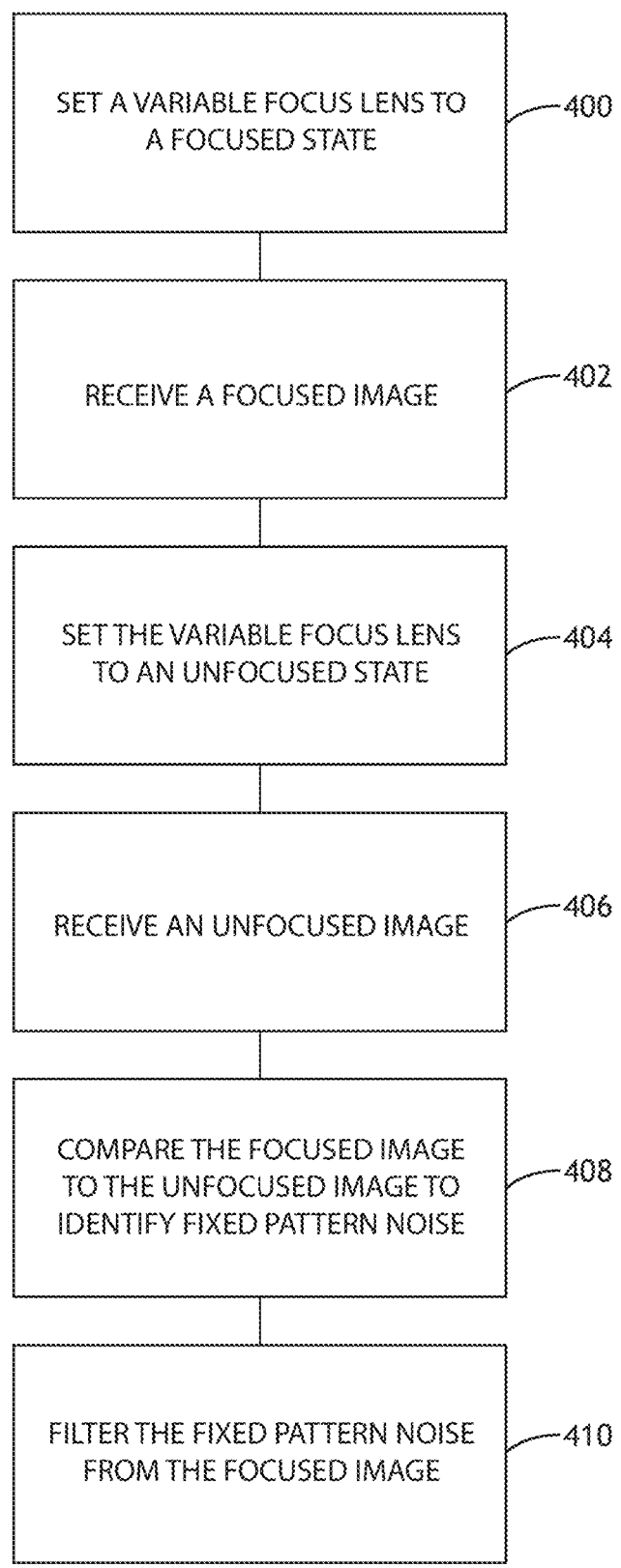
FIG. 4 shows a flowchart of a method for identifying fixed pattern noise according to an exemplary embodiment.

Referring to FIG. 4, a flowchart of a method for identifying fixed pattern noise according to an exemplary embodiment is shown. A variable focus lens is set 400 to a focused state to focus an image on an image sensor of a camera and a focused image is captured 402. Then the variable focus lens is set 404 to an unfocused state to defocus the image on the image sensor of a camera and an unfocused image is captured 406, generally comprising fixed pattern noise inherent to the image sensor under current conditions.

In at least one embodiment, the focused and unfocused images are compared 408 to identify fixed pattern noise and the identified fixed pattern noise is filtered 410 from the focused image; then a high-pass filter may be applied. The identified fixed pattern noise may be used to filter subsequent focused images. In at least one embodiment, multiple unfocused images may be used to refine the identified fixed pattern noise, such as via averaging or iteratively identifying differences. In-situ calibration of fixed pattern noise requires generating fairly flat scenes without disturbing the frame rate of the intended video stream by time sharing or temporally multiplexing regular video frames and the frames that will be processed for the calibration purpose. A fairly flat scene can be generated by setting the lens to the proper defocus. Multiple flat scenes may be processed to calibrate fixed pattern noise and saved in memory. The multiple flat scenes may be periodically updated as necessary. A high-pass filter is applied after a subtraction of the calibrated fixed pattern noise.

In at least one embodiment, the unfocused image may be directly subtracted from the focused image to effectively filter fixed pattern noise and perform a high-pass filter operation. Direct subtraction may be most effective when fixed pattern noise is dominating.

In at least one embodiment, periodic unfocused images may be used to monitor the state of the image sensor. In certain contrast conditions, an unfocused image may be used to identify stuck or dead pixels in the camera sensor, or perform other integrity monitoring. For example, misbehaving pixels may always report a high value or a low value, even when defocused.

Transition between a focused and unfocused state may be synchronized with image capture to prevent transitional images from being display or otherwise used in image recognition. Furthermore, transitional images may be stored for use during preprocessing.

Embodiments may be useful for enhanced vision systems performing low contrast image recognition such as identifying runway lights in fog. Runway lights are high spatial frequency targets; at a distance, runway lights tend toward just a single sensor pixel. Fog is fairly uniform and low in edges and detail, resulting in a low contrast scene. Fog makes it difficult for the runway lights to easily penetrate and reach the camera sensor, thus the runway lights are just barely brighter than the fog.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A method comprising:
identifying varying contrast conditions;
setting a variable focus lens to a first state wherein an image path is unfocused at an image sensor of a camera when a change in contrast conditions is identified;
capturing at least one unfocused image frame;
setting the variable focus lens to a second state wherein the image path is focused at the image sensor of the camera;
capturing at least one focused image frame;
subtracting the at least one unfocused image frame from the at least one focused image frame to produce at least one high pass and fixed pattern noise filtered image frame;
comparing the at least one unfocused image frame to the at least one focused image frame to identify fixed pattern noise associated with the identified contrast condition; and
identifying one or more faulty pixels via the at least one unfocused image by determining that the one or more faulty pixels consistently report either a high value or a low value.

2. The method of claim 1, further comprising:
filtering out fixed pattern noise from the at least one focused image frame based on the comparison; and
applying a high pass filter to the at least one filtered focused image frame.

3. The method of claim 1, further comprising:
periodically setting the variable focus lens to an unfocused state and capture at least one unfocused image; and
identifying changes to fixed pattern noise associated with the camera over time.

4. The method of claim 1, further comprising:
recording one or more transition image frames during a period of transition between the first state and the second state; and
performing preprocessing on the one or more transition image frames to identify initial fixed pattern noise.

5. The method of claim 1, further comprising synchronizing image capture via the camera and a period of transition between the first state and the second state to remove transitional images from the image stream.

6. A system comprising:
a camera;
a variable focus lens disposed in an image path of the camera; and
at least one processor in data communication with the camera, the variable focus lens, and a memory storing processor executable code for configuring the at least one processor to:
identify varying contrast conditions;
set the variable focus lens to a first state wherein the image path is unfocused at an image sensor of the camera when a change in contrast conditions is identified;
capture at least one unfocused image frame;
set the variable focus lens to a second state wherein the image path is focused at the image sensor of the camera;
capture at least one focused image frame;
subtract the at least one unfocused image frame from the at least one focused image frame to produce at least one high pass and fixed pattern noise filtered image frame;
compare the at least one unfocused image frame to the at least one focused image frame to identify fixed pattern noise associated with the identified contrast condition; and
identify one or more faulty pixels via the at least one unfocused image by determining that the one or more faulty pixels consistently report either a high value or a low value.

7. The system of claim 6, wherein the at least one processor is further configured to:
filter out fixed pattern noise from the at least one focused image frame based on the comparison; and
apply a high pass filter to the at least one filtered focused image frame.

8. The system of claim 6, wherein the at least one processor is further configured to:
periodically set the variable focus lens to an unfocused state and capture at least one unfocused image; and
identify changes to fixed pattern noise associated with the camera over time.

9. The system of claim 6, wherein the at least one processor is further configured to:
record one or more transition image frames during a period of transition between the first state and the second state; and
perform preprocessing on the one or more transition image frames to identify initial fixed pattern noise.

10. The system of claim 6, wherein the at least one processor is further configured to synchronize image capture via the camera and a period of transition between the first state and the second state to remove transitional images from the image stream.

11. The system of claim 6, wherein the variable focus lens comprises no mechanical moving parts.

* * * * *